United States Patent Office 2,895,056
Patented July 14, 1959

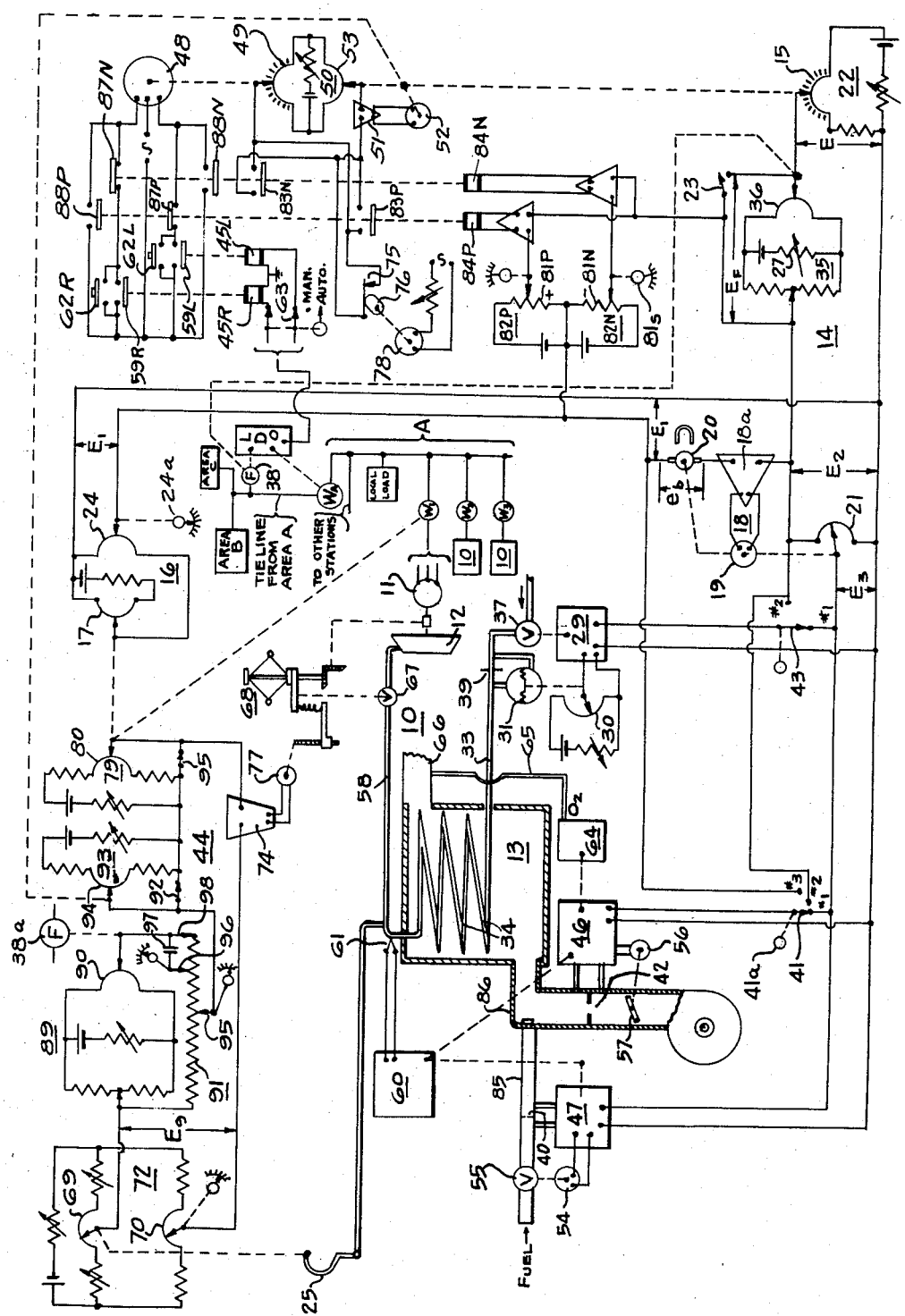

2,895,056

FREQUENCY-BIASED CONTROL SYSTEMS FOR ELECTRICAL GENERATING UNITS

Edward S. Bristol, Philadelphia, Pa., assignor to Leeds and Northrup Company, Philadelphia, Pa., a corporation of Pennsylvania Application July 8, 1957, Serial No. 670,548

21 Claims. (Cl. 290—2)

This invention relates to control systems for electrical generating units comprising an alternator and prime move for driving it and a vapor generator for supplying the prime mover.

The system of the invention is adapted to apply controlled variations of fuel supply and/or of steam pressure so as to cooperate with or perform a function analogous to the function of a prime mover speed governor in response to deviations from normal electrical frequency. Accordingly, the control system includes apparatus for regulating the rate of generation of vapor by the vapor generator in accordance with the electrical generation required of the alternator with provisions for introducing into said apparatus a frequency-bias corresponding in sense and extent with the deviations from normal of the operating frequency of the power distribution network connected to the alternator. Additionally or alternatively, there may be provided control means for regulating the supply of vapor to the prime mover to maintain predetermined pressure conditions of vapor available for supply to the prime mover. Where such additional apparatus is included, there may also be included with it a frequency-bias.

More particularly, for a vapor generator having fuel and air inputs, and for maintaining actual electrical generation in balance with required generation, the fuel input may be controlled in accordance with a frequency-biased required-generation signal determined at least in part by the integrated difference between the actual generation of the alternator and its frequency-biased generation requirement; and the air input may be controlled from the aforesaid signal, an actual generation signal, a signal corresponding with the frequency-biased generation requirement, a feed-water flow signal, or a steam-flow signal. The supply of feed water to the vapor generator may be controlled from any of the aforesaid signals (other than the feed-water flow signal).

The aforementioned frequency-biased required-generation signal produces a desired controlled variation of fuel supply in response to deviations from normal of electrical frequency. Such variation in fuel supply with frequency permits the vapor generator to cooperate with the action of a prime mover speed-governor in response to deviations of electrical frequency. Even in the absence of a speed governor, the output of the unit would change with system frequency, due to the bias on the fuel supply, to perform a function similar to that obtained with a speed governor. In systems where the steam pressure effects change of the governor setting to maintain predetermined pressure conditions, a frequency bias may be inserted in the steam-pressure control circuit to permit the steam pressure control action on the governor to cooperate with the speed response of the latter.

In certain of its aspects, the present invention provides improvements of and may be combined with the invention disclosed and claimed in my copending application Serial No. 561,408, filed January 26, 1956 which issued on November 18, 1958 as Letters Patent 2,861,194.

The invention further resides in control systems having features of novelty and utility hereinafter described and claimed.

For a more detailed understanding of the invention, reference is made in the following description to the single figure of the accompanying drawing, which schematically shows a complete control system for an electrical generating unit.

Referring to the drawing, the electrical generating unit 10 comprises an alternator 11, a prime mover 12 for driving the alternator and a vapor generator 13 for supplying steam or other motive fluid to the prime mover 12. The generating unit 10 of an area A supplies electrical power to a distribution network usually including several other areas, such as areas B, C, each having its own generating equipment and its own area load. These areas are interconnected by tielines over which an individual area, such as area A, of which unit 10 is one generating unit, may send or receive power to or from the rest of the distribution network in accordance with an area schedule based on flat tieline load, frequency-biased tieline load, frequency, time error, or other operating condition of the distribution network. Upon deviations of an area from its schedule, new generation requirements may be imposed upon individual generating units of the area.

The control system shown in the figure of drawing regulates the rate of vapor generation by vapor generator 13 in accordance with the electrical generation required of the alternator 11 of unit 10 and regulates the vapor input to the prime mover 12 in accordance with the changes in pressure of vapor generated by vapor generator 13. Either or both of these regulating actions is biased in accordance with any existing deviation from the normal operating frequency, usually 60 cycles, of the distribution network.

In the particular generating unit shown the vapor generator or boiler 13 is of the super-critical pressure, series type having low heat storage due to absence of steam drums. Though not limited thereto, the invention is particularly suited for control of generating units including a boiler of this type.

Signals for controlling the supply of fuel, air and feed water to the boiler 13 are shown as derived from the control network 14. The slidewire 15 of potentiometer circuit 22 included in network 14 is adjustably set, as hereinafter described, so that its output voltage E corresponds with the generation required of unit 10 to satisfy its share of the load on area A. The network 14 also includes (with switch 23 open) a frequency-bias bridge circuit 35 whose slidewire 36 is adjusted relative to the slidewire contact by a frequency-metering device 38 so that the output voltage $E_f$ of circuit 35 is zero for normal operating frequency of the power distribution network and is of increasing magnitude in positive or negative sense for increasing negative or positive deviation of the operating frequency from its normal value. The magnitude of the frequency-bias effect may be adjusted by rheostat 27. Thus, the output voltage $E_2$ across the output slidewire 21 of control network 14 is a frequency-biased required-generation signal.

The signal voltage $E_1$ varying with the actual generation of alternator 11, as distinguished from its required generation, is derived from network 16 which includes slidewire 17 positioned relative to its contact by wattmeter $W_1$ which meters the actual output of alternator 11. The voltage $E_1$ may be all or any selected fraction of the effective output voltage of slidewire 17 depending upon the manual setting as by knob-dial 24a of the potential-dividing slidewire 24.

Whenever the actual electrical output of unit 10 is not equal to its required output, a controller 18 including an amplifier 18a responsive to the unbalance of voltages $E_1$, $E_2$ effects operation of reversible motor 19 in direction dependent upon the sense of the unbalance. Controller 18, as well as others of the system, may be of any suitable type such as shown for example in U.S. Letters Patent 2,113,164. A small D.C. generator 20 driven by motor 19 provides a voltage $e_b$ in opposition to the initiating unbalance of voltages $E_1$, $E_2$. These three voltages, through controller 18, effect operation of motor 19 and tachometer generator 20 at a speed substantially proportional to the difference between voltages $E_1$, $E_2$ and in a direction dependent upon which of the voltages $E_1$, $E_2$ is the greater.

The motor 19 also adjusts the output slidewire 21 of control network 14 so that the position of this slidewire relative to its contact is representative of the time integral of the difference between voltages $E_1$, $E_2$. There is thus provided a reset control action which continues until $E_1$ and $E_2$ are equal. Thus, the output voltage $E_3$ of network 14, utilized as hereinafter described for control of the rate of vapor generation by boiler 13, is dependent upon the generation-requirement at normal frequency (represented by voltage E) and upon the existing deviation from normal frequency (represented by voltage $E_T$) to provide for a proportional control action, and is dependent upon the integrated difference between the actual generation of alternator 11 and its required generation to provide for a reset control action. In the system shown in the drawing, the relation existing between the output signal $E_3$ of network 14 and the total frequency-biased required-generation signal $E_2$ can be expressed as a fraction, or percentage, directly related to the integrated difference between the actual and the required electrical output of unit 10. The voltage $E_3$ may be obtained by other arrangements such as shown, for example, in my aforesaid application.

The voltage $E_3$ is applied as an input signal to fuel controller 47 to which is also applied a feedback signal produced by means including a metering device 40 in the fuel supply line 85 of burner 86 of boiler 13. When the actual rate of supply of fuel does not correspond with or balance input signal $E_3$, the reversible motor 54 is operated in response to action of controller 47 to reposition valve 55 in the fuel supply line. Thus, with the proportional and reset components in signal $E_3$, upon change of unit generation requirement, there is a proportional plus reset action in the control of fuel supply.

With selector switch 41 operable by knob 41a but in the #1 position shown, the voltage $E_3$ is also applied as an input signal to air-controller 46 to which is also applied a feedback signal produced by means including a suitable metering device 42 in the air supply line to the boiler. When the actual rate of supply of air does not correspond with or balance the required-generation signal $E_3$, the reversible motor 56 is operated by its controller 46 to adjust the air valve 57, or equivalent, to effect such correspondence.

With selector switch 43 in the #1 position shown, the fractional output voltage $E_3$ of network 14 is also applied as an input signal to feed-water controller 29 to which is also applied a feedback signal produced by a suitable arrangement for metering the flow of feed water through feed line 33 to the boiler tubes 34. Specifically and as shown, the metering arrangement may comprise an orifice plate 39, a differential pressure-responsive device 31 connected across the orifice and a potentiometer circuit including a slidewire 30 adjusted by device 31. When the rate of supply of feed water, as represented by the output voltage of slidewire 30, does not correspond with the input signal $E_3$, the valve 37 is adjusted by the controller 29 through a reversible motor, not shown, to effect such correspondence.

Either or both of the air and fuel controllers 46, 47 may have its input modified in accordance with the temperature of the steam produced by boiler 13 to change the relationship between feed-water input and heat input. As schematically shown, controller 60 has an input element, exemplified by thermocouple 61, responsive to the temperature of the generated steam. The controller 60 also includes an output element coupled, as exemplified by broken lines, to internal elements of controllers 46, 47. More specifically and as more fully shown in my aforesaid copending application, the percentage of signal $E_3$ applied to controllers 46, 47 may be varied with changes in temperature of the generated steam by adjustment of input slidewire, fed by signal $E_3$.

In addition to provision for automatic re-adjustment of the relation between heat input and feed-water flow in response to deviation from desired vapor temperature, the system may also include, as fully shown in my aforesaid application, provision for re-adjustment of the fuel-air ratio to maintain high combustion efficiencies despite variations in fuel quality. For brevity here, controller 64 shall be understood to include a gas analyzer connected by sampling line 65 to the boiler stack 66; and its output, as exemplified by broken line, adjusts the air controller in accordance with deviations from a desired oxygen ($O_2$) content of the stack gases.

For a boiler provided with twin furnaces, having separate fuel and air supplies to each, it is contemplated that identical adjustment as indicated would be applied in parallel to both air controllers in response to average oxygen content of exit gases from the two furnaces. Advantageously such action could be supplemented by relative adjustment of the two fuel controllers from difference in oxygen content of gases from the two furnaces, as explained in Scutt Patent 2,784,912.

For all positions of switches 41, 43, the input signal to the fuel controller is the signal voltage $E_3$, which, as above pointed out, provides for both proportional and reset control actions. For the #2 position of selector switch 43, the input signal to the feed-water controller 29 is the frequency-biased required-generation signal $E_2$ providing for a proportional control action. The input signal to the air controller 46 is different for each of the three positions of switch 41: as above described for the #1 position, the input signal is $E_3$ providing both proportional and reset control actions; for the #2 position, the input signal is $E_2$ providing for proportional control action from the required generation signal; for the #3 position, the input signal is the actual generation signal $E_1$ for proportional control action from actual generation.

The heat content and quality of fuel supplied to boiler 13 will undergo under normal conditions periodic variations which will result in changes of generation of alternator or generator 11 even though there is no change in the requirement as represented by the signal $E_2$. These resultant changes in generation will then act through motor 19 upon the position of contact of slidewire 21 to vary $E_3$. Since the air supply and the feed-water supply should remain substantially constant under these conditions, it is desirable to control these quantities from the signal $E_2$ and to permit the variations in fuel to operate through voltage $E_3$ to the fuel controller only. Such an arrangement will provide a more stable operation of boiler 13.

As thus far described, the control system shown, under conditions of normal system frequency, supplies heat input to boiler 13 sufficient to maintain the actual generation of generator 11 equal to the required generation as determined by the setting of slidewire 15. Additionally, during periods when the system frequency has departed from its normal value, the heat input to boiler 13 is correspondingly varied by the frequency-bias developed by bridge 35 to bias the heat supplied to boiler 13 so that the actual generation from the unit 10 may have a frequency governing characteristic which will effect or permit changes in actual generation to assist the system to meet system load changes even though there has been no change in the actual requirement for unit 10 under normal frequency conditions. When the system frequency has been returned to normal, the bias effect is then removed from the heat supply and actual generation is then maintained equal to required generation by control of the heat supplied to the boiler 13. In this way the unit 10 may assist in meeting the load changes occurring in remote areas B and C although the actual requirement for unit 10 for normal frequency remains fixed.

In the control system as thus far described, the station operator may manually set the slidewire 15 of control network 14 to correspond with the electrical output required of generating unit 10. The required generation of each of other similarly controlled units of the station may similarly be preset by the operator so that the station will supply its share of the local load of the area and also its contribution to the tieline load which may be metered by wattmeter $W_A$. However, and as more fully disclosed in copending application Serial No. 609,111, filed September 11, 1956 and issued on December 23, 1958 as Letters Patent 2,866,102, the generation requirements may be determined by the area's load dispatcher's office LDO from which there are transmitted to the stations of the area their respective generation requirements. As now described, Raise and Lower pulses from the load dispatcher's office are utilized automatically to change the setting of slidewire 15 of control network 14 for the generating unit 10.

The coils of relays 45R, 45L are selectively energized by the Raise and Lower pulses to energize reversible motor 48 which adjusts the slidewire 49 of a self-balancing network 50 to a position corresponding with the new generation requirement. The controller 51 responds to unbalance of network 50 and reversible motor 52 thereupon effects rebalancing adjustment of slidewire 53 of network 50. Concurrently with such rebalancing adjustment, the motor 52 moves the slidewire 15 of control network 14 to the position corresponding with the new required generation of alternator 11. The control network 14 thereupon changes the rate of vapor generation by the boiler 13 as previously described to increase or decrease the electrical output of the alternator to match the required generation.

To limit the rate at which a new generation requirement may be imposed upon generating unit 10, the input circuit of the rebalancing controller 51 of network 50 includes a switch 75 which is periodically opened as by a cam 76 driven by motor 78. Thus, the rate at which the generating unit 10 is permitted to absorb a new generation requirement is limited: the rate may be adjusted by varying the percentage of time that switch 75 remains closed. Accordingly, it is possible to obtain greater fuel economy than if the generating unit were always permitted to change its rate of generation at the limit of its capability. There are also prevented the thermal stresses to which the boiler and turbine are otherwise subjected because of too rapid change in input.

While the rate at which the requirement slidewire 15 can be adjusted is limited, as set forth above, it is possible for the requirement signal to deviate from the actual generation by an excessive amount due often to transient disturbances such as partial loss of vacuum at the turbine outlet which decreases power output for a given steam flow. Under such abnormal circumstances, it is desired that the requirement, though initially set by the operator or from the load dispatcher's office, be rapidly re-set to within a predetermined deviation from the actual generation. In order to accomplish this, there are provided the positive and negative deviation limit circuits 82P and 82N. Whenever the requirement signal produced by slidewire 15 exceeds the actual generation signal $E_1$ from slidewire 24 by an amount determined by the setting by knob and dial 81s of the negtive deviation limit slidewire 81N located in the limit circuit 82N, the relay 84N is energized to close, as by contacts 88N, an energizing circuit for motor 48 to operate motor 48 and the slidewire 49 in a requirement-lowering direction. The opening o fcontacts 87N or relay 84N prevents energization of motor 48 in opposite sense even though the raise-relay 45R closes its contacts 59R. At this time contact 83N closes to provide a path around switch 75 to permit motor 52 to operate the contacts for the slidewires 15 and 53 rapidly to follow the motion of slidewire 49. This override action is continued until the difference between the re-set requirement and the actual generation is no greater than that determined by the setting of slidewire 81N.

Similarly when the requirement for any reason is less than the actual generation by more than the amount determined by the setting of slidewire 81P, the relay 84P is energized to close contacts 88P and 83P rapidly to increase the re-set requirement signal as by adjustment of slidewires 15, 53 and 49. With relay 84P energized, its contacts 87P are open to preclude energization of motor 48 through the circuit which includes contacts 59L of the lower-relay 45L.

The override action of relays 84N and 84P moves requirement slidewire 49 away from positions to which the unit 10 is temporarily incapable of responding.

It is desirable that these features be retained even when the required-generation signal is manually adjusted by the operator. For such purpose, the relay switches 59R, 59L controlled by Raise and Lower relays 45R, 45L are respectively paralleled by the normally open manually-operable switches 62R, 62L. To put the control system in condition for manual setting of the required generation, the switch 63 is opened to disconnect the relays 45R, 45L from the pulse-transmission line from the load dispatcher's office. To raise or lower the generation requirement, one or the other of the switches 62R, 62L is held closed until slidewire 49 is adjusted by motor 48 to a position for which its dial reading corresponds with the generation required of unit 10. The switch 62R or 62L is then opened and the motor 52 will continue to operate until the slidewire 15 is set to the new generation requirement. The rate at which slidewire 15 moves to the new position depends upon the percent closure-time setting of switch 75 and the state of the deviation relays 84P, 84N.

For control of the generating unit 10 with the control system as thus far described, the speed governor 68 may be manually set to fully open the steam valve 67 for the normal operating frequency. For this type of control operation, the steam pressure is permitted to vary and the electrical output of unit 10 is determined by the heat input to boiler 13 controlled by the frequency-biased required-generation signal as above described, with the speed governor functioning to provide throttling action only during the periods for which the frequency is above normal. Such type of operation has the advantage that it substantially reduces the throttling losses introduced by partial closure of the steam valve.

To maintain predetermined steam pressure in supply line 58, provision is made for varying the setting of the speed governor 68. For such purpose, there is provided a control network 44 including the bridge circuit 72 having a slidewire 69 positioned by the Bourdon tube 25 or other device responsive to the steam pressure at a suitable point in the steam supply line 58. When the steam pressure deviates from the normal value corresponding with the manual setting of slidewire 70, the output voltage $E_9$ of the bridge corresponds in sense and magnitude with the pressure deviation. For the moment assuming no other voltages existent in network 44, the controller 74 responds to energize the reversible motor 77 to change the setting of governor 68, in sense to return the pressure to the normal value corresponding with the manual setting of slidewire 70. With governor 68 omitted, the motor 77 may be coupled directly to change the setting of valve 67.

Provision is made for biasing the steam pressure set point, corresponding to the setting of slidewire 70, in accordance with deviations of electrical frequency from normal. This action causes the steam pressure control action on the governor to cooperate with the speed response of the latter which, pending the effect of frequency-bias on fuel supply as above explained, is necessarily accompanied by a steam pressure disturbance. For such purpose, the control network 44 includes a second bridge circuit 89 including a slidewire 90 automatically adjusted with respect to its contact by the frequency-responsive device 38a. At normal operating frequency of the power distribution network, the bridge 89 is in balance and its output voltage is zero. When the actual frequency departs from normal, the bridge is unbalanced and its output voltage is of sense and magnitude corresponding with the frequency deviation. Any fraction of this output voltage may be selected for frequency-bias purposes in network 44 by manually setting contact 95 of potential-dividing slidewire 91 to the desired value. Temporarily to enhance this bias by response to rate of change of frequency, the higher range portion of slidewire 91 may be shunted by capacitor 97. The extent to which the selected bias is so temporarily modified may be predetermined by the manual setting of a second contact 96 of the slidewire 91. By opening switch 98, response to rate of change of frequency alone may be secured. By adjustment of the frequency-bias action as described, the steam pressure control action can be accommodated to the speed governor action to the extent desired; pressure disturbances necessary for governor action can thus be partially or completely unopposed by the pressure control.

In order to utilize heat storage capacity of the boiler in temporarily meeting load changes, it may be desired to employ controlled variation of output steam pressure. Thus, a temporary increase in steam flow without change in fuel supply can be secured by further opening valve 67 so as to reduce pressure in supply line 58. Conversely, temporary decrease of steam flow will result from reduction in the opening of valve 67. Such action is provided by the elements below. With switch 92 open, there is included in control network 44 a potentiometer circuit 93 including a slidewire 94 adjusted by motor 52 to produce an output voltage corresponding with the required generation of unit 10.

With switch 95 open, there is also included in control network 44 a potentiometer circuit 79 having a slidewire 80 adjusted by wattmeter $W_1$ to produce an output voltage corresponding with the actual generation of unit 10 and opposed in polarity to the voltage from slidewire 94.

With both of the switches 92 and 95 open, the difference between the output voltages of networks 79 and 93 corresponds with the difference between the actual and required generations of alternator 11. This voltage difference is effective in the input circuit of controller 74 to bias the steam pressure set point established by slidewire 70. Thus, so long as required generation exceeds actual generation, controller 74 operates to maintain steam pressure at a value reduced in amount in proportion to the difference in generation values. Conversely, when actual generation exceeds requirement, steam pressure is controlled at a proportionately higher value.

A further use of either network 93 or 79 used separately is to vary steam pressure setting with required or actual load. For example, slidewire 70 can be set to establish desired steam pressure at zero or minimum operating load and voltage from slidewire 94 can be introduced in polarity and amount to produce a desired controlled increase of steam pressure with increase of required generation. Switch 92 would be open and switch 95 closed for this type of operation.

What is claimed is:

1. A system for controlling the electrical generation of an electrical generating unit including a vapor generator, a prime mover supplied from said vapor generator, and an alternator driven by said prime mover and connected to a power distribution network, said system comprising means adjustable to produce a first signal representative of the electrical generation required of said unit, a first control means responsive to said first signal for varying the rate of vapor generation by said vapor generator, a second control means responsive to the pressure of the generated vapor for varying the rate of supply of vapor to said prime mover, and frequency-biasing means for modifying the action of at least one of said control means in sense and magnitude corresponding with deviations from normal network frequency.

2. A system for controlling the electrical generation of a unit including a vapor generator, a prime mover, an alternator driven by said prime mover, and a governor responsive to the alternator speed for varying the vapor input to said prime mover from said vapor generator, said control system comprising means to produce a signal representative of the electrical generation required of said unit, control means responsive to said signal for varying the rate of vapor generation by said vapor generator, control means responsive to the pressure of the generated vapor for varying the setting of said governor, and frequency-biasing means for modifying the action of at least one of said control means in sense and magnitude corresponding with deviations from normal network frequency.

3. A control system as in claim 1 in which the frequency-biasing means produces a second signal combined with said required-generation signal to provide a composite signal determining the action of said first control means in its control of the rate of vapor generation.

4. A control system as in claim 1 additionally including means for limiting the rate of change of said first signal upon change of said adjustable means to vary the generation required of said unit.

5. A control system as in claim 3 additionally including means for modifying said composite signal as applied to said first control means in accordance with the integrated difference between the actual generation of said alternator and its frequency-biased generation requirement.

6. A control system as in claim 5 in which the first control means includes a fuel-controller and an air-controller, in which the fuel-controller responds to said modified frequency-biased required-generation signal, and in which the air-controller responds to the unmodified frequency-biased required-generation signal.

7. A control system as in claim 5 in which the first control means includes a fuel-controller, an air-controller, and a feed-water controller, in which the fuel-controller responds to said modified frequency-biased required-generation signal, in which the air-controller responds to the actual generation of said alternator, and in which the feed-water controller responds to the unmodified frequency-biased required-generation signal.

8. A control system as in claim 5 in which the first control means includes a fuel-controller, an air-controller, and a feed-water controller, and in which said fuel-controller, said air-controller and said feed-water controller each responds to said modified frequency-biased required-generation signal.

9. A control system as in claim 1 in which the frequency-biasing means modifies the action of the second control means for variation of the rate of supply of vapor to the prime mover in accordance with the pressure of the available vapor plus or minus a control effect dependent in sense and magnitude upon the existing deviation from normal network frequency.

10. A control system as in claim 1 in which the second control means is additionally responsive to the actual generation of the alternator.

11. A control system as in claim 1 in which the second control means is additionally responsive to the difference between the actual generation of the alternator and the required generation thereof.

12. A control system as in claim 5 in which the first control means includes a fuel-controller and an air-controller, in which the fuel-controller is responsive to said modified composite signal, and in which the air-controller is responsive to a signal which at least in part varies with changes in network frequency.

13. A system for controlling the electrical generation of a generating unit including a vapor generator having fuel and air inputs, a prime mover supplied from said vapor generator, and an alternator driven by said prime mover, said system comprising means adjustable to produce a first singal representative of the electrical generation required of the unit, means for producing a second signal representative of the actual generation of the alternator, means for integrating the difference of said first and second signals, means for controlling the fuel input to the vapor generator in accordance with said required-generation signal and the integrated difference of both of said signals, and means for controlling the air input to said vapor generator in accordance with a selected one of said signals.

14. A system for controlling the electrical generation of a generating unit including a vapor generator, a prime mover supplied from said vapor generator, and an alternator driven by said prime mover, said system comprising a control network, means for producing in said network a first signal voltage coreresponding with the electrical generation required of said alternator, means for producing in said network a second signal voltage corresponding in sense and magnitude with the deviations in frequency from normal frequency, means for producing a third signal voltage corresponding with the actual generation of said alternator, means for integrating the difference between said third signal voltage and the algebraic sum of said first and second signal voltages, and means for controlling the heat input to said vapor generator to match said algebraic sum of said first and second signals with said third signal.

15. A system for controlling the electrical generation of a unit including a vapor generator, a prime mover, an alternator driven by said prime mover, and a speed governor responding to changes in operating frequency to vary the vapor input from said prime mover from said vapor generator, said control system comprising means to produce a signal representative of the electrical generation required of the unit, a fuel-controller responsive to said signal for regulating the supply of fuel to said vapor generator, and an air-controller responsive to a signal varying with the operating frequency to regulate the supply of combustion air to said vapor generator.

16. A system for controlling the electrical generation of an electrical generating unit including a vapor generator, a prime mover supplied from said vapor generator, and an alternator driven by said prime mover and connected to a power distribution network, said system comprising means adjustable to produce a first signal representative of the electrical generation required of said unit, frequency biasing means for producing a second signal in sense and magnitude corresponding with deviations from normal network frequency, and control means responsive to said first and second signals for varying the rate of supply of vapor to said prime mover.

17. A system as in claim 16 additionally including means responsive to the difference between the electrical generation required of said unit and the actual generation of said unit for changing said required generation signal to reduce said difference when it exceeds a predetermined value.

18. A system as in claim 16 additionally including means for limiting the rate of change of said first signal upon change of said adjustable means to vary the generation required of said unit.

19. A system for controlling the output to an alternating current electrical distribution network of a generating unit comprising an electrical generator, a prime mover therefor and a vapor generator for supplying vapor to said prime mover, said system comprising means for producing a first signal representing the electrical generation required of said unit for carrying its predetermined share of the load on the distribution network, means for producing a second signal representing the actual generation of said unit, heat-input control means for varying the heat input to said vapor generator until said first and second signals are equal, and means for producing variations in the actual generation of said electrical generator with change in frequency comprising means responsive to the frequency of said distribution network for producing a frequency bias signal and circuit connections for combining said bias signal into said first signal whereby a frequency effect is introduced into the controlled heat input to said vapor generator.

20. A system as in claim 19 in which said heat-input control means varies the fuel input to said vapor generator in accordance with said first and second signals and controls the air input to said vapor generator in accordance with a selected one of said signals.

21. A control system as in claim 1 in which said second control means is additionally responsive to said first signal.

References Cited in the file of this patent
UNITED STATES PATENTS

| | | |
|---|---|---|
| 2,053,061 | Bristol | Sept. 1, 1936 |
| 2,113,164 | Williams | Apr. 5, 1938 |
| 2,243,944 | Donaldson | June 3, 1941 |
| 2,433,725 | Ziebolz | Dec. 30, 1947 |
| 2,681,418 | Bristol | June 15, 1954 |
| 2,754,429 | Phillips | July 10, 1956 |
| 2,773,994 | Cohn | Dec. 11, 1956 |
| 2,784,912 | Scutt | Mar. 12, 1957 |